INPUT/OUTPUT CONTROL SYSTEM FOR ELECTRONIC COMPUTERS

Filed Feb. 14, 1966

INVENTORS.
HANS B. MARX
BRUCE W. NUTTING
THOMAS MARRA
BY Francis A. Varallo
AGENT

*INVENTORS.*
HANS B. MARX
BRUCE W. NUTTING
THOMAS MARRA
BY
Francis A. Varallo
AGENT INVENTORS.
HANS B. MARX
BRUCE W. NUTTING
THOMAS MARRA
BY Francis A. Varallo
AGENT

United States Patent Office 3,419,852
Patented Dec. 31, 1968

3,419,852

INPUT/OUTPUT CONTROL SYSTEM FOR ELECTRONIC COMPUTERS

Hans B. Marx, Broomall, and Bruce W. Nutting, West Chester, Pa., and Thomas Marra, Cherry Hill, N.J., assignors to Burroughs Corporation, Detroit, Mich., a corporation of Michigan

Filed Feb. 14, 1966, Ser. No. 527,322
14 Claims. (Cl. 340—172.5)

ABSTRACT OF THE DISCLOSURE

The present disclosure describes an input-output control unit for a modular computer system having as its principal subdivision, a "module interface control" and whose function is the providing of interface between various units of the computer system, the governing and controlling of communications therebetween and the timing synchronizing of the system.

The present invention relates to an input/output control system for electronic data processing and computing equipment. More particularly, the present invention relates to an input/output control unit or module which may be incorporated as the principal interface between a central data processor and memory, and between a central data processor and a plurality of input and output units in a modular computer system and which controls the transfer of information between the various units of the modular computer system.

In addition to providing the interface function and controlling communication, the input/output control module of the present invention provides timing synchronization between memory and a central data processor such that the system may operate with a memory having a different operating rate from that at which the computer is being operated for a particular application. The requirements of the system for being transportable both in the air and on the ground are discussed in co-pending application Ser. No. 527,350 for "Modular Computer System" of Hans B. Marx which is assigned to the same assignee as the present application. The input/output control module forms the essential communicating, synchronizing and interface mechanism for coordinating the system.

Other types of input/output control modules for modular systems have been known. For example, in the modular computer of the D–825 system, manufactured by the Burroughs Corporation, there are input/output control units provided. However, such input/output control units essentially are designed for fixed, nontransportable systems. Moreover, the input/output control units of the present invention not only provide additional communications and interface features beyond the requirements of prior art input/output control modules, but additionally, they perform a synchronization function. The present control units are required to be adaptable to interface a larger variety of input and output devices which operate over a range of speeds, and to be adaptable for communication with various types of memories, the latter being also interchangeable in the modular system. Further, the input/output control module of the present invention must be designed to operate with a central data processor which itself is synchronized by an external clock unit and therefore the input/output unit must be adaptable to operate at various frequencies of both memory and computer modules.

Other systems such as a system known as the B 2000 system, the polymorphic computer system, do not have the features of portability and of modularity of the present invention nor do they possess the above-enumerated advantages. None of the prior art systems are adaptable to portable use both on land and in the air and over rugged terrain and none are adaptable to the communication, interface and synchronization coordination which the input/output control module of the present invention provides.

Accordingly, a principal object of the present invention is to provide an input/output control module for a modular computer system whch is designed for airborne use as well as on the ground regardless of terrain, and which will be lightweight to the extent of being portable, and which proivdes for features of interface between various units, governing or control of communication, and for synchronization in timing of various units.

A second primary purpose of the present invention is to provide an input/output control module for a modular computer system which provides the communication, interface and time synchronization functions of the system.

Another aim of the present invention is to provide an input/output control module for a modular computer system which will enable various types of memories to be utilized along with a central data processor.

Another object of the present invention is to provide an input/output control module which will, as the heart of a modular computer system, provide the functions of control of intercommunication, interface between modules and which will enable synchronization to computer time which in itself is dependent upon an external unit having either a variable frequency or a pluralty of frequencies covering a comparatively wide band.

Another purpose of the present invention is to provide an input-output control module with a flexible interrupt system including a variable mask ararngement such that the priority of inputs from external sources may be selected under program control.

Another aim of the present invention is to provide an input/output control module which will not only serve as the heart of the interface time synchronization and communication routing means of the system, but which is adaptable to simple modification such that, the modification of this unit alone will enable the system to be tailor-made to various applications and uses.

The features of the invention which are believed to be novel are set forth with particularity in the appended claims. The invention itself, however, both as to its organization and method of operation, together with further objects and advantages thereof, may best be understood by reference to the following description when taken in connection with the drawings, wherein:

FIG. 1 also depicts the inputs and outputs to the remainder of a modular computer system embodying the I/O control unit of the present invention;

Figure 1:
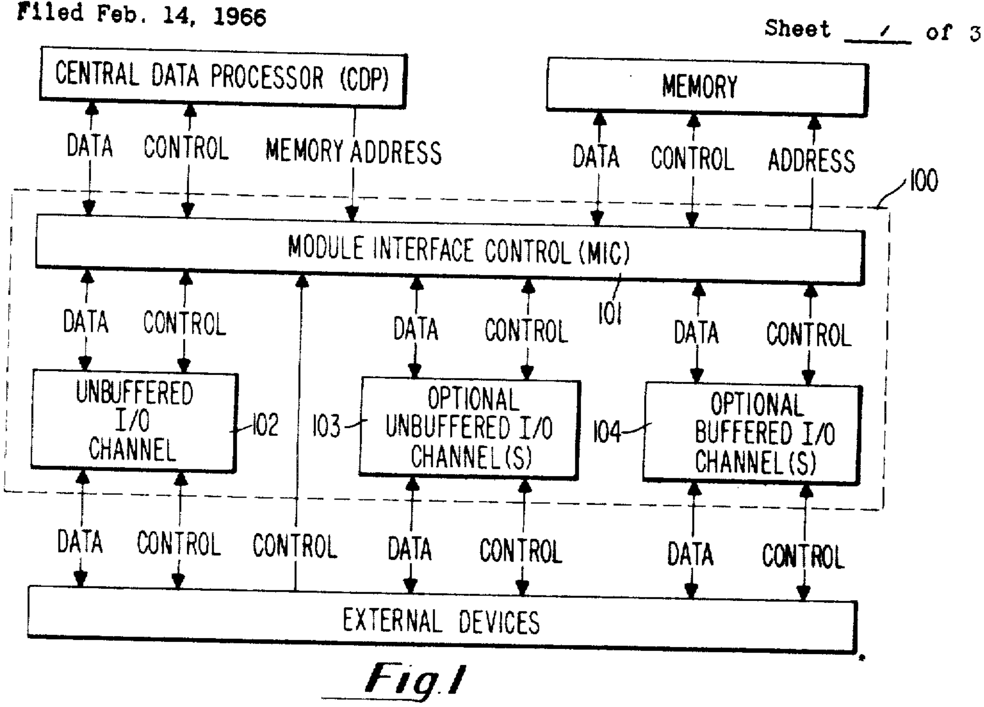
FIG. 1 is a block diagram of a typical input/output (I/O) control module of the present invention with optional elements so indicated and illustrating essential module interface control and I/O channel subdivisions.

Referring to the drawings and more particularly to FIG. 1, the block schematic representation of the modular input/output control module of the present invention, the module 100 comprises a module interface control unit (MIC) 101 and one or more I/O channels such as channel 102. Additional channels such as channels 103 and 104 may be provided. These channels may be unbuffered channels, such as unbuffered I/O channels 102 and 103, the organization of which will be considered in detail hereinafter, or may be buffered channels such as buffered I/O channel 104. The number of unbuffered and buffered channels may vary in accordnace with the particular computer application. Usually at least one unbuffered I/O channel 102 will be provided in a system. Optionally, buffered I/O channels 104 of any number may be provided. The function of the buffered channel is to service the peripheral devices which handle large blocks of data at relatively fast transfer rates, such as displays, magnetic tapes, communication channels, and so on.

As depicted in FIG. 1, the module interface control 101 is connected to the central data processor (CDP) of the type described in copending application Ser. No. 527,123 for "Central Data Processor for Computer System Having a Divided Memory" in the name of H. Marx, et al. and to a memory module or modules of the computer such as those described in copending application Ser. No. 527,-360 for "Memory System" in the name of R. Hatton et al. by way of data, control, and address lines or buses. Both of the last-mentioned copending applications are also assigned to the same assignee as the present application and the detailed descriptions of a CDP and memory contained respectively therein are hereby incorporated by reference in the present application. The module interface control may also be connected to the external devices via a control bus shown immediately to the right of the unbuffered I/O channel 102. The external device(s) may also be connected to the I/O channels via the illustrated data and control buses (not numbered). As will be later described in greater detail, the modular interface control (MIC) subdivision 101 is a unit comprising logic circuits whose function it is to control all data transferred to and from memory. This data is in turn transferred to or from either the central processor or processors, and to or from other external input and/or output devices. The module interface control (MIC) subdivision 101 controls the timing synchronization of the central data processor and the memory module(s). Thus, the module interface control subdivision 101 controls all transfers between the central data processor and the external input and output devices. The module interface control 101 responds to control signals and control words or descriptors from the central data processor or memory, control signals from the various I/O channels 102, 103 and/or 104 which are conveyed via the data and control buses (not numbered) between the module interface control subdivision 101 and each of the I/O unbuffered channels 102 and 103 and the buffered I/O channel or channels 104. Additionally, the MIC also responds to special control signals from external devices which are used to interrupt the normal operation of the central data processor.

Figure 2:
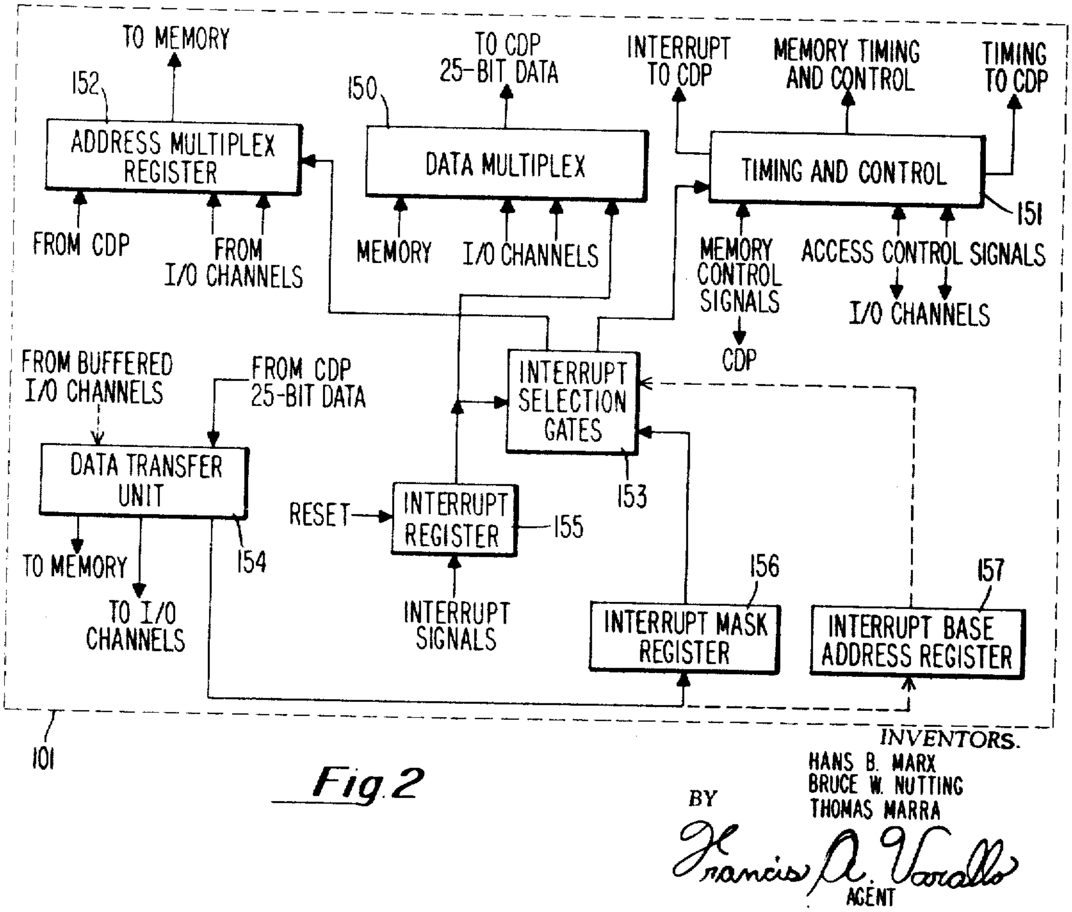
FIG. 2 is a block diagram of a modular interface control (MIC) subdivision of the preferred input-output control system of the invention illustrated in FIG. 1.
Figure 2A:
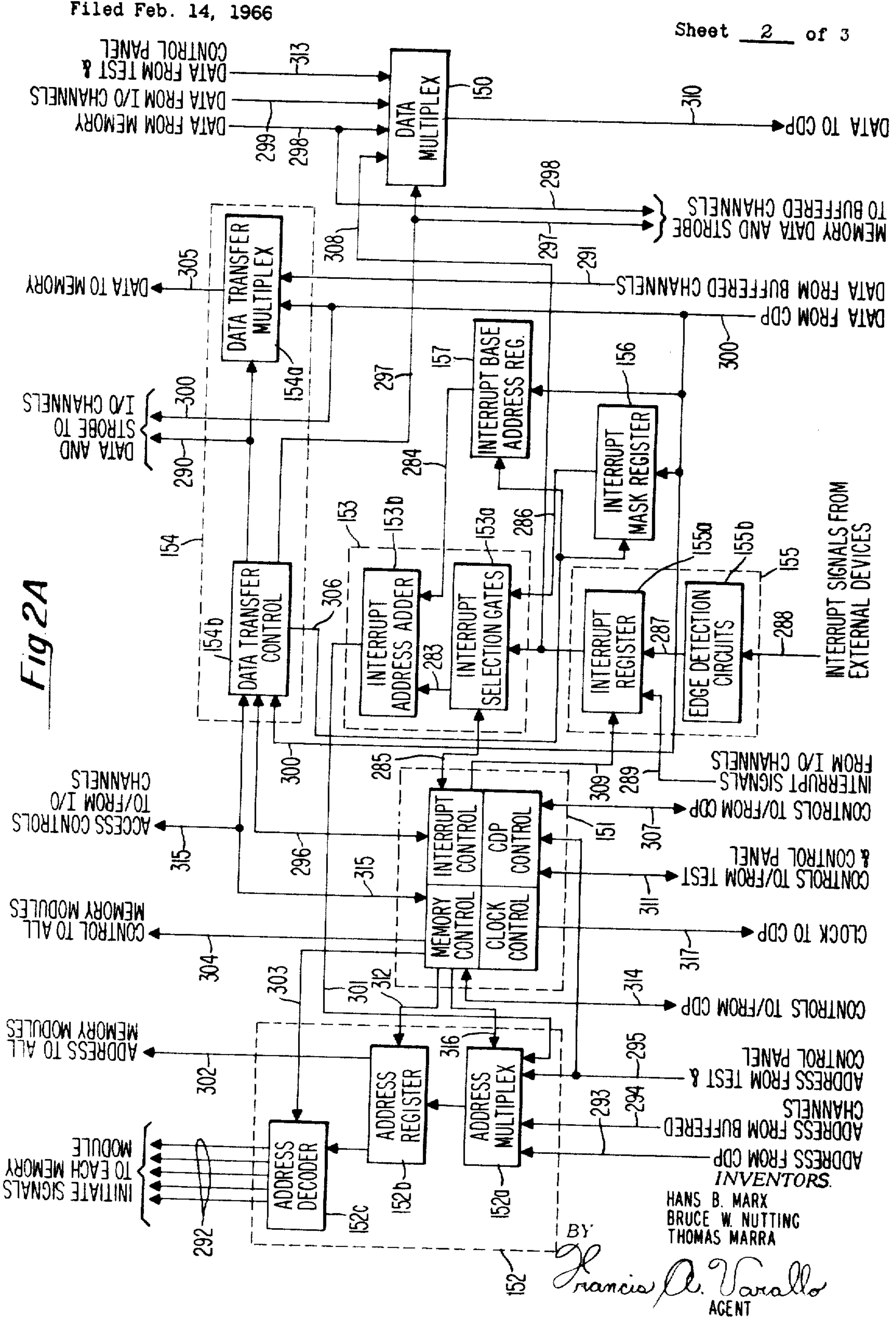

Reference is now made to FIG. 2, which depicts in simplified form the module interface control unit of the I/O module of FIG. 1 and FIG. 2A which illustrates in detail the organization of the blocks of FIG. 2 and their interconnection. It should be noted that in FIG. 2A, the lines indicated by reference numerals are shown respectively as if they are single electrical conductors whereas, they may in fact, comprise pluralities of conductors. A module interface control division is basic to any variation of the input/output configuration of an I/O module of the present invention. It performs the function of providing the control mechanism whereby the synchronization of timing between the memories and the central data processors and the remainder of the system including the external devices will be maintained. In this manner, communication between the various modules and units of the system is effected. The module interface control 101 of FIG. 2 controls all data transfers between the modules of the computer system and the peripheral devices or input and output units. Additionally, the module interface control division 101 provides control for the interrupt mechanism of the computer system. A data multiplex unit 150 provides gating suitable for supplying data inputs to the central data processor of the referenced Ser. No. 527,-123 application, as selectively determined by the timing and control unit 151 cooperating with the data transfer control section **154*b* (FIG. 2A) of the data transfer unit 154. Although not limited thereto, in an actual operative embodiment, the data multiplex 150 as well as the other "multiplex" units described herein are comprised of a plurality of RTL integrated circuits in a NAND gate configuration, such circuits and their appliactions being well known to logic designers in the computer art. In said operative embodiment the data multiplex unit 150 receives inputs comprising 25 bit words on line 298 of FIG. 2A from the memory data registers described in the referenced Serial No. 527,360 application, and words of varying length on line 299 of FIG. 2A from each of the I/O channels. It should be noted that the information from memory will always comprise 25-bit words; however, the information from the I/O channels will comprise both data words of 25 bits and control function words of less than, but not more than, 25 bits. After being gated through the data multiplex unit 150 the information is routed to the central data processor by way of line 310, in 25-bit data words. Where a less than 25-bit data word input has been received by the data multiplex unit 150**, zeros will appear in unused positions.

A timing and control mechanism 151 is connected to the data transfer control unit **154*b* by lines 296 and 315 and this unit controls via line 297 the opening and closing of gates in the data multiplex unit 150 to select and control the transfer of words therethrough, as required. That is, the timing and control mechanism 151 and data transfer control unit 154*b* select which word in the data multiplex unit 150 will be permitted to be sent to the central data processor. Such selection is based on controls or descriptor words received from the central data processor, on the same line 300 as data from the CDP but which are accompanied by strobe signals via line 307 to identify them as such. In a similar manner, the timing and control unit 151 and data transfer control 154*b* provide strobe signals via line 297 to the buffered I/O channels to cause them to accept input data from the memory data registers via bus 298** when such data transfers are required. The timing and control unit also provides a number of other functions which will be described hereinafter in the description of that unit.

An address multiplex register 152 which comprises an address multiplex **152*a*, and address register 152*b*, and an address decoder 152*c* is also provided. Address multiplex 152*a* accepts inputs comprising 15-bit address words from the central data processor on line 293 and from the I/O buffered channels on line 294. Additionally, interrupt selection gates 153 are provided to furnish various addresses to the address multiplex register 152 by way of line 301 when servicing an interrupt. The address register 152*b* holds the address of any word being accessed in memory units. In an actual operative embodiment the address register 152*b*, as well as the other registers mentioned in the present application, such as the interrupt registers, utilize "D Flip-Flops" which are described on page 126, Chapter 5 of the well known text "Logical Design of Digital Computers" by Montgomery Phister, Jr. These flip-flops, which are also considered in detail in the referenced CDP application Ser. No. 527,123, are described by Phister as "delay" memory elements—circuits having respectively a single input and an output equal to the input one bit-time earlier. It should be understood however, that the present invention is not limited to the use of this specific configuration of flip-flop, but may employ other circuits at the discretion of the logical designer. The input to the address multiplex register 152 from the central data processor is the input from the memory address multiplex unit associated with the central processor. The 12 least significant bits of the address register 152b are sent directly to the memory modules which are the subgroups of the MEMORY block of FIG. 1 via a memory address bus 302. These 12 bits define the location of the word to be accessed within a particular selected memory module. The first three bits of the 15-bit word in the address register 152b are decoded within the address decoder 152c which may be provided there for that purpose. The eight decoded signals from the most significant three bits of the address multiplex register word, in combination with memory timing and control signals from the memory control section of the timing and control unit 151 by way of line 303 designate the particular memory module selected. The latter module is enabled by one of the decoded signals on lines 292 in order that it may receive or treansmit data to the address which is contained in the address register 152b, as further specified by the memory control portion of 151 which provides signals on line 304** indicative of either a read or write function.

A data transfer unit 154 which is shown in FIG. 2A as comprising a data transfer multiplex 154a and a data transfer control 154b, is provided in the module interface control unit 101. The data transfer unit optionally may comprise a plurality of buses or in some cases it may contain gates for special routing requirements. If the embodiment contains one or more buffered I/O channels then the input bus which is shown in dashed lines in FIG. 2 is provided in the module interface control unit 101. In such case the data transfer unit, in addition to the bus therethrough, is provided with a data transfer multiplex 154a which comprises gates of the same type as are found in the data multiplex 150 described hereinbefore. The data tranfers multiplex 154a under direction of the data transfer control 154b via bus 290 which routes the data to the memory modules via bus 305 from either the buffered I/O channels where provided, or from the central data processor. Data from the buffered channels and the CDP is delivered to the data transfer multiplex 154a over lines 291 and 300 respectively.

When there are no buffered I/O channels provided, the data transfer unit 154 comprises only a bus on which signals are received over line 300 from the central data processor and are directed to the memory via bus 305, to the I/O channels by way of line 300 and to the interrupt base address register 157 and the interrupt mask register 156 of the interrupt logic, and to the data transfer control 154b by way of line 300 and its multiple branches. The selection of which module or which logic receives the 25-bit data words from the CDP over line 300 is determined by the enabling of the input section of the particular receiving unit which is to accept the data word input by strobe signals provided by data transfer control 154b over lines 290 and 306.

An interrupt unit mechanism is provided within the module interface control division 101 and comprises the interrupt selection gates 153 and interrupt registers 155 and 156. An interrupt base address register 157 may also be provided for some applications. The function of the interrupt logic circuits comprising interrupt selection gates 153, interrupt register 155, and interrupt mask register 156 is to accept control signals from the I/O channels within the input/output module(s) or from external device(s), to provide a means of recording the interrupt control signals, to determine the priority of these interrupt signals and to initiate a program respective to such interrupt signals which will provide the approriate computer action required for the particular type of interrupt initiated. The register section 155a (of FIG. 2A) of the interrupt register 155 receives the interrupt signals from the I/O channels at an input provided therein by way of line 289. The interrupt register section 155a comprises a plurality of flip-flops each of which is used to record the presence of a particular interrupt. The interrupt signals remain in the interrupt register section 155a until the program currently in the central data processor of the referenced Ser. No. 527,123 application generates the proper input command over line 307 to transfer the contents of the interrupt register 155a via line 308 and the data multiplex unit 150 to the central data processor over bus 310 for analysis. Upon executing this transfer the interrupt register 155a is reset along reset inputs serviced by the interrupt control portion of 151 and line 309. All interrupt register flip-flops are set by one-clock-time pulse. The interrupt signals from external sources other than the I/O modules are fed via line 288 to appropriate input circuitry such as the edge detection circuits 155b which are provided in the interrupt register 155. These interrupt register input circuits 155b detect the leading edge of the input signal so that interrupt signals of varying lengths are all reduced to single clock time pulses for the purpose of setting the appropriate bits of the interrupt registers 155a by way of line 287. Thus, the flip-flop which is designated to record a particular interrupt is set only when the leading edge of an interrupt signal designating that particular interrupt occurs. The interrupt signal input pulses may extend for a relatively long period of time and since it would be undesirable to engage the central data processor for that whole time, the leading edge of the signal is utilized to set the flip-flop and the flip-flop cannot be again set by the same signal until this signal has terminated. Thus, a particular interrupt is processed only once and the speed of the central data processor need not be adversely affected if it happens to be operating at a rate which is faster than the interrupt signal and particularly if it is a multiple of the rate of the interrupt signal generation such that there might be overlapping. In order to accomplish this, the interrupt register contains circuitry which causes the flip-flop servicing a particular interrupt to switch to the set state only once in response to a given interrupt and this is effected by making the flip-flop responsive only to the leading edge of the incoming interrupt signal by the use of edge detection circuits 155b. These circuits are described in detail and claimed in copending application Ser. No. 616,304 for "Single-Pulse Switch Logic Circuit" of Bruce W. Nutting et al. which is assigned to the same assignee as the present application.

The interrupt mask register 156 is provided. The interrupt mask register comprises a plurality of flip-flops. Each of the flip-flops in the interrupt mask register may be set by way of lines 300 and 306 under control of the central data processor to designate those interrupts or groups of interrupts which are not to cause any interrupt action by the central data processor. The interrupt mask register is responsive to output data transfers from the central data processor via bus 300 under control of signals provided on line 306 by the data transfer control section 154b of the data transfer unit 154. Thus under program control the interrupt mask register may be set by instructions, so that the programmer can determine which interrupt he wishes to service.

The interrupt selection gates unit 153 is provided which contains gating circuitry. If any bit of the interrupt register 155 is set and the corresponding bit of the interrupt mask register 156 is not set, the indication is that it is desired not to mask such an interrupt, and the interrupt selection gates 153a of unit 153 permit the signal to be fed therethrough into the interrupt control portion of timing and control unit 151 by way of line 285. Upon initiation of the interrupt by the interrupt and CDP control portions of the timing and control unit 151, the interrupt selection gates 153a via bus 283 and the interrupt address provide to the address multiplex register 142 over line 301 the address at which the program interrupt will be executed. This address is a memory address which is generated by the interrupt selection gates 153 to select a word in memory which corresponds to a particular interrupt or group of interrupts. That is, the address in memory which is addressed by the action of the interrupt selection gates 153 is the first word of a subroutine of a given priority, which subroutine is located in a position in memory determinable by the interrupt selection gates 153. This memory address is a fixed address or a group of fixed addresses in memory.

A bit in the interrupt mask register may mask a group of bits of the interrupt register. This is to permit masking with a single bit of all interrupts of a particular type. The latter function is accomplished by gates in the interrupt selection gates unit 153 and is a fixed condition dependent upon the particular circuit configuration which is provided in the interrupt selection gates unit 153. To effect this function, one bit in the mask register 156 is used to inhibit a plurality of interrupt selection gates which prevents several signals corresponding to those gates from being fed to the timing and control unit 151. While various interrupts may be masked and therefore such interrupts will not cause an interrupt subroutine to be followed of themselves, these interrupts will still be recorded in the interrupt register and when the central data processor requests data from the interrupt register 155 in the course of an interrupt routine caused by an unmasked interrupt, the occurrence of these previous masked interrupts will be indicated by the appropriate bits of the interrupt register 155. In this way, the user can determine whether or not interrupts occurred in the running of a program regardless of whether or not he wishes to service such interrupts.

The optional provision of an interrupt base address register 157 may be provided and in such case, the location in memory of particular interrupt subroutines need not be fixed. Instead, the first word may be set in accordance with an address which is fed into and stored in the interrupt base address register 157 by means of lines 300 and 306 until it is desired to change that address, in which case the interrupt base address register is changed accordingly. In this situation, the address of the first word in a given subroutine is formed by adding in the interrupt address adder **153*b* the contents of the interrupt base address register 157 to a fixed value associated with that interrupt as determined by the interrupt selection gates 153*a*. The addition takes place in the interrupt address adder 153*b* in embodiments where an interrupt base address register is included to provide relative interrupt addressing and associated flexibility in the program. The interrupt base address register 157 is loaded under instructions from the central data processor in the form of particular output instructions. These instructions are sent to the interrupt base address register 157 via the bus 300 when strobed by a signal over line 306 from the data transfer control 154*b***. The base address register will not be changed except when loaded as explained above and is not reset by power turn-on or system clear operations.

The interrupt base address register 157 is a 15-bit flip-flop register which contains a full memory address, the first three bits of which designate the particular memory module and the last twelve bits of which are the memory address within the module to which the information of the interrupt selection gates is to be added to form the actual address in memory at which the first word of a subroutine for servicing the particular interrupt, is located.

Reference is next made to the timing and control unit 151. The timing and control unit 151 comprises four major areas: (1) interrupt control logic, (2) central data processor control logic, (3)memory timing and control and (4) basic clock and clock control for the computer system.

The interrupt control logic accepts inputs from the interrupt selection gates **153*a* when a program interrupt is to be executed. Upon receiving the interrupt selection gates input which comprises a single signal indicating that an interrupt is to be serviced, the interrupt control logic sends an appropriate request to the central data processor via the "interrupt (to CDP)" line which is one of the plurality of control lines designated 307 in FIG. 2A. When the central data processor has acknowledged this request by initiating an interrupt routine the interrupt control logic inhibits all other interrupts until such time as the data from the interrupt register 155*a* is sent over bus 310 to the CDP by way of line 308 and the data multiplex 150, and the interrupt register is reset by the interrupt control operating over line 309. This prevents a new interrupt from being initiated while the present interrupt is still being serviced by the central data processor. The time at which the reset of the interrupt register 155*a*** occurs is under program control.

The central data processor control logic is used to start and stop the central data processor in response to external commands from a unit such as a remote switch. The number and location of specific external switches which would be utilized with this computer timing control logic would depend upon the particular requirements of the user.

Provision is made in the timing and control unit 151 for inputs from an external programmer control panel over line 311 to cause the central data processor to perform single instructions, stop or start on selected addresses as selected by switches on the programmer's control panel via line 295, and to recycle the program between selected addresses. Switches may also be provided to enter data in the CDP from the test and control panel via line 313. These features are used in such work as diagnostics and debugging. These features are also useful in checking out new programs, that is, programming debugging as well as computer hardware debugging.

The timing and control logic 151 further comprises memory timing and control logic which establishes the timing and priority of all memory access operations. The memory timing and control logic is responsive to "request" signals from the central data processor over line 314 or from the I/O channels over line 315. These "request" signals specify that a memory cycle is desired and also specify wthether it is a read or a write which is required. The memory timing and control unit 151 determines if the memory is busy. If the memory is not busy, the appropriate memory timing and control signals are sent from the timing and control unit 151 over line 304 to the memory modules selected by the three most significant bits in the address decoder portion **152*c* of the multiplex register unit 152**.

The memory timing and control module also selects the source of the address placed in the address multiplex register 152. That is, the address multiplex register 152 receives inputs either from the central data processor or from the buffered I/O channels or from the interrupt selection gate 153, to provide the address in the address multiplex register of the particular memory word corresponding to the request from either the central data processor or an I/O channel as indicated by the memory address control signals coming from the timing and control unit 151 via 316. The address register 152b is strobed by signals provided by the memory control portion of 151 over line 312, concurrently with the signals appearing on line 316. The addresses from the interrupt selection gates 153 are specified by signals from the central data processor to the timing and control unit via 307 in response to an interrupt request to the central data processor also via line 307. The central data processor acknowledges the request for an interrupt by initiating memory access control signals over bus 314 which it feeds to the timing and control unit 151 in the module interface control unit 101. Upon initiating a memory cycle, the timing and control unit establishes a memory busy condition for a period of time consistent with the particular memory being used. The length of this time of the particular memory to which the I/O interface control unit adapts itself is fixed by a particular design of the interface control timing and control logic 151. This timing is made variable so suit the particular memory for which it is intended and in accordance with user or customer requirements at the time of manufacturing the device. Alternatively, of course, several different kinds of logic units each adaptable to a different kind of memory may be utlized in particular applications, my be manufactured, and each will vary in the timing in accordance with the particular memory for which it is intended. If several types of memories are used in one configuration, the memory timing and control logic in the timing and control unit 151 may be provided with more than one timing cycle logic. Thus, the proper delay depends upon the particular memory module being referenced where certain memory modules have been assigned to a given type of memory. That is, provision is made such that if any one of several types of memories is being accessed, then the proper cycle for that type of memory is introduced by the particular timing and control logic in unit 151.

All clock and strobe signals used in an operative system incorporating the present invention are derived from a 4-megacycle oscillator. The output of this oscillator is fed into a pulse shaper circuit which provides clock pulses of a nominal 100-nanosecond duration at a nominal rate of 4 million pulses per second. These pulses are inverted for use as the clock inputs of the flip-flops located in the clock distribution system logic.

The clock distribution system consists of a grey code counter comprised of two flip-flops which continually count the incoming clock pulses modulo 4. The gate is used to decode one of the four possible states of this two flip-flop grey code counter, one state of which is decoded and arbtirarily assigned a designation phase 1. The phase 1 signal is used as an input to another flip-flop which in turn will produce a phase 2 signal. The phase 2 signal is in turn used to set a flip-flop the output of which is designated as the phase 3 signal. The phase 3 signal is gated with the clock signals from the pulse shaper in order to form the phase 3 clock signal $\phi$3CL which is used by the memory control logic to strobe the three most significant bits of the address multiplex register. The phase 3 signal is also used to set a phase 4 flip-flop, the output of which is gated with the clock pulses from the pulse shaper to produce the basic clock pulses for the I/O module. These pulses are of two polarities, the positive-going pulses being suitable for direct input to flip-flop strobe input lines, and the negative-going pulses, suitable for further gating and for use as strobe signals. The clock control portion of 151 operating over line 317 provides gates which may inhibit clock pulses to the CDP for the purpose of synchronizing the CDP operation with the operation of memory modules of varying cycle times. This operation is described in detail in the referenced CDP application Ser. No. 527,123.

Figure 3:
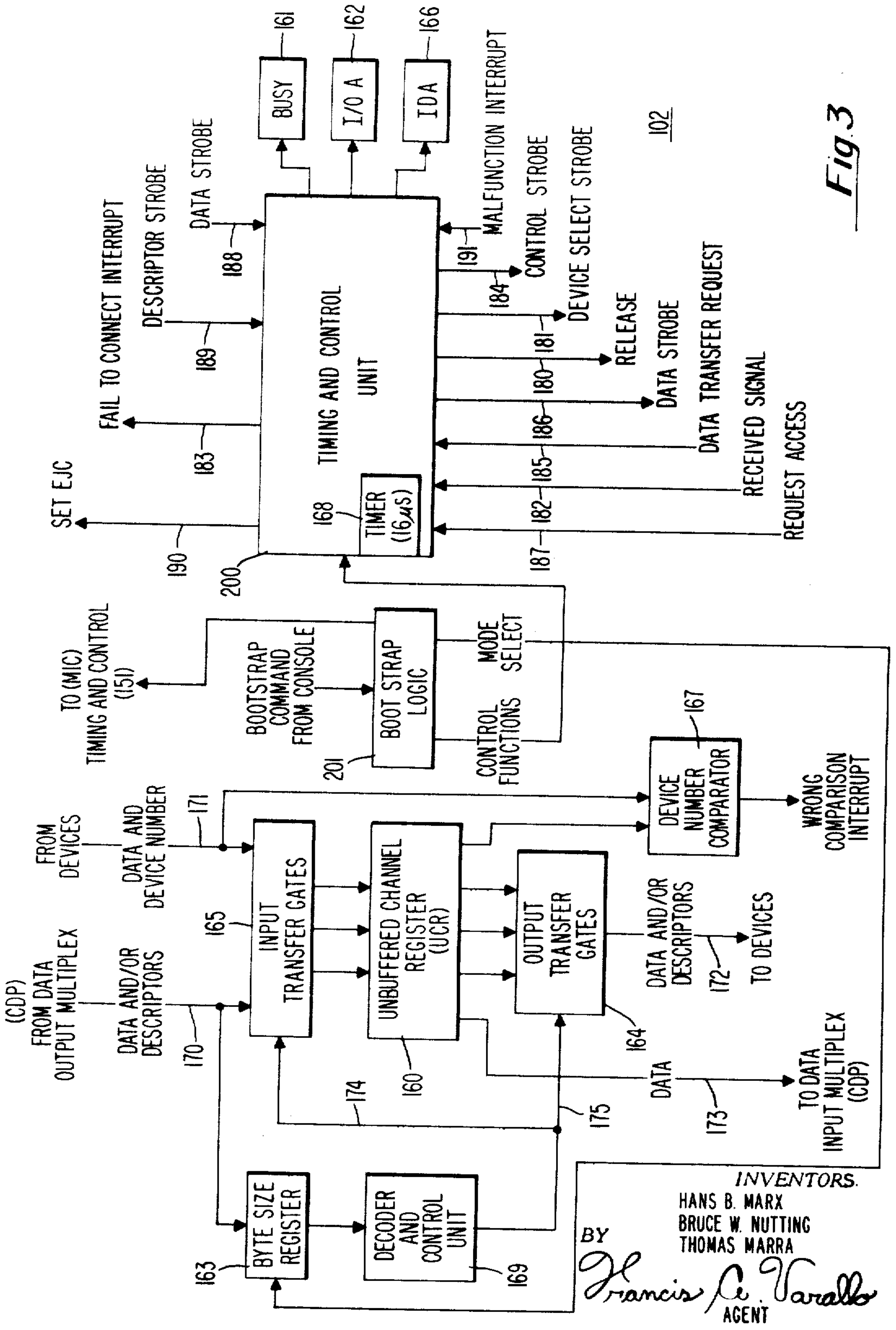
FIG. 3 is a block diagrammatic representation of an unbuffered I/O channel subdivision of the I/O control module of the preferred embodiment of the present invention illustrated in FIG. 1.

The organization of the logic for the unbuffered channel subdivision of the present invention identified as either 102 and 103 in FIG. 1, is shown in block diagram form in FIG. 3. In an actual embodiment, this channel is capable of servicing 127 terminal devices. The program controls the unbuffered channel operation by using control word descriptor commands to select a terminal device and to define the function to be performed.

Two types of descriptors are accepted by the unbuffered channel: the device descriptor, which selects one of 127 terminal devices and specifies a number of functions to be performed, and the control descriptor which is used to execute a number of control operations on the unbuffered channel or on the selected terminal device. Data transfers to and from the device are under direct program control. The variable assembly and distributing feature permits data transfers of variable byte sizes. The output data source may be the memory or one of the arithmetic registers. Input data may be transferred to a memory location or one of the arithmetic registers. Once a device is selected it remains selected until released by an unconditional release from the program or by a conditional release from the program or by a conditional release due to the selection of another device.

A device descriptor from the data output multiplex (DOM) unit of the computer system appearing on bus 170 is used to select the terminal device. If the unbuffered channel is busy, it does not accept the descriptor and sets the External Jump Control (EJC) flip-flop via bus 190, which indicates that the command was not able to be executed, and implies that such command will have to be reaffirmed subsequently. If the unbuffered channel is not busy, it accepts the descriptor and stores it in the unbuffered channel register (UCR) 160; at the same time the unbuffered channel generates a 4 $\mu$sec. "release" command to the device(s) by way of bus 180, and sets the BUSY flip-flop 161 and I/O active (IOA) flip-flop 162. The setting of the BUSY flip-flop 161 signifies that there is usable information stored in the unbuffered channel register. The set state of the I/O active flip-flop 162, indicates that a contact has been made, or is being established between the unbuffered channel and one of the terminal devices. At the end of the release command the descriptor is gated through the output transfer gates 164 to bus 172 and together with the "device descriptor strobe" on bus 181, are sent to the devices. Simultaneously, a 16 $\mu$sec. timer 168 in the timing and control unit 200 is started. The unbuffered channel waits for either a "received" signal from the selected device on bus 182 or the completion of the 16 $\mu$sec. count. Upon the occurrence of either, the unbuffered channel examines the device number returned by the device on bus 171 and compares it in comparator 167 with the descriptor sent to the device via bus 172 and still stored in the unbuffered channel register. Note that if no device sends a "received" signal on bus 182, the unbuffered channel will examine the lines at the end of the 16 $\mu$sec. period and accept that information as the device number. Since the devices must keep their outputs to the bus at logical zero, the device number received is zero, which is the number reserved for the unbuffered channel itself, and therefore represents an incorrect device number. If the "sent" and "returned" device numbers are the same, the BUSY flip-flop 161 is reset and the unbuffered channel is ready for the next operation. If the device numbers are different, the device number comparator 167 generates an output signal which specifies a "wrong comparison interrupt." Under these conditions, the unbuffered channel resets the BUSY and I/O active (IOA) flip-flops 161 and 162 respectively, generates a "fail-to-connect interrupt" on bus 183, and sends a 4 $\mu$sec. "release" command to all devices by way of bus 180. The unbuffered channel will then be ready for the next operation.

Processing of a control descriptor by the unbuffered channel proceeds in the following manner. When a descriptor is received on bus 170, the BUSY bit or state of BUSY flip-flop 161 is examined and if set, the External Jump Control (EJC) flip-flop is set by way of bus 190 and no further action is taken on the descriptor. If the BUSY bit is reset, the descriptor is stored in the unbuffered channel register (UCR) 160, provided with the I/O active flip-flop 162 is set. If the I/O active flip-flop 162 is reset, the byte size, that is, a predetermined number of bits out of the total number of bits comprising a word, is stored in the byte size register 163 and since no other usable information is contained in the descriptor, no other action is taken. If the I/O active flip-flop 162 is set, the descriptor must be sent to the devices by way of bus 172. Therefore, it is stored in the unbuffered channel register 160 and 1 $\mu$sec. later the "control descriptor strobe" on bus 184 is sent in common to the devices. The selected device uses the "control descriptor strobe" to store the descriptor and to generate a 4 $\mu$sec. "received" signal on bus 182 to be set to the unbuffered channel. Detection of the "received" signal by the unbuffered channel causes the "control descriptor strobe" to be turned off. At this time the unbuffered channel is ready for data processing.

An output device will generate a "data request" on bus 185 whenever it has been selected and is ready to accept data. This "data request" is sent to the unbuffered channel. Action will be taken on this request only after the unbuffered channel has received a data word on bus 170 from the central data processor (CDP). When the CPD sends a data word, the state of the BUSY flip-flop 161 is checked, and if the BUSY flip-flop 161 is set, the unbuffered channel will not accept the data word and will set EJC via bus 190. If the BUSY flip-flop 161 is not set, it is set at this time and the word is stored in the UCR 160. With the BUSY flip-flop set and a "data request" from the device, a "data strobe" is generated on bus 186 and sent to the device. The proper output transfer gates 164 are "primed" through the combined action of the byte size register 163 and the decoder and control unit 169 operating on bus 175 so that the proper data byte is represented to the bus 172. The device stores the data in its buffer and transmits a "received" signal on bus 182 to the unbuffered channel. The "received" signal is used to turn off the data strobe 186. The operation continues in this manner until the word is completely processed, at which time the BUSY flip-flop 161 is reset and the unbuffered channel is ready to process the next word. Note that the program must examine the BUSY bit or state of flip-flop 161 to determine when the unbuffered channel is ready for the next word. The unbuffered channel will continue processing data words until the program releases it unconditionally by a "release" command, in which case the state of BUSY flip-flop 161 does not matter, or conditionally by selecting another device which requires that the BUSY-flip-flop must be in a reset condition.

An input device will generate a "data transfer request" on bus 185 whenever it has a byte ready for transfer to the unbuffered channel. The unbuffered channel will then generate a "data strobe" via bus 186 and transmit it to the device which will use the request to enable the data on the data bus 171. When the device receives the "data strobe" it generates the "received" signal on bus 182. The unbuffered channel uses the "received" signal to load the data in the unbuffered channel register (UCR) 160. It should be noted that the proper input transfer gates 165 have been primed by byte size register 163 and decoder and control unit 169 by way of bus 174 so that the data received, is placed in the proper byte size position in the UCR. The unbuffered channel also uses the "received" signal to turn off the "data strobe." This procedure continues until the full word is assembled. At this time the input data available (IDA) flip-flop 166 is set to inform the program that there is a data word available. The program will execute an instruction to transfer the input data word to an arithmetic register or memory by way of data bus 173. The IDA flip-flop 166 is reset at the same time, and the unbuffered channel is now ready to process the next word. This mode of operation continues until the program releases the device.

A "request access" signal to the unbuffered channel transmitted from one of the devices on bus 187 indicates that the device demands immediate access. This priority situation causes an interrupt signal to be applied to the interrupt register 155 (FIG. 2) of the module interface control. The computer program recognizes the nature of the function to be performed, in accordance with the type of device requesting access.

The "malfunction interrupt" signal on bus 191 signifies, as its name implies, that the device has detected some form of malfunction and as a result, an interrupt signal is applied to the interrupt register.

The "data" and "descriptor strobe" signals on buses 188 and 189 respectively are transmitted from the central data processor to the unbuffered channel to indicate the nature of the information the channel is receiving on bus 170, that is, whether it is a data or descriptor word.

The bootstrap logic indicated by block 201 in FIG. 3, is used to load programs into the memory from the paper tape reader without the benefit of having a program in core memory to control the operation of the system. A unique feature of the bootstrap logic is its ability to receive the program information, store it in memory, and then read it out of memory and transmit it back to the paper tape reader controller where it is compared to the original data. A wrong data comparison results in termination of the bootstrap operation.

The operation commences when the bootstrap control is depressed in the paper tape reader assembly. This signal controls the operation of the paper tape reader controller and is also sent to the input/output module (I/O) where the operation of the I/O and central data processor (CDP) is also controlled. The paper tape reader controller assembles a data word and transmits it to the unbuffered channel through the normal interface described hereinbefore in connection with the operation of the unbuffered channel. In the meantime, the module interface control (MIC) has received the bootstrap command from the reader and generated the proper signals to set up the unbuffered channel for input operation and to receive a 24-bit word from the reader.

When the unbuffered channel receives the data word it sets the IDA flip-flop 166. The first word is the address to be used in storing the data word. The paper tape reader controller sends a signal to the I/O indicating that the word received is an address. The MIC will use the address signal and the IDA signal to transfer the contents of the unbuffered channel register (UCR) 160 through the data input multiplex (DIM) and data input register (DIR) (in the CDP) to the P-counter (in the CDP) where it is stored as an address. An "address received" signal is generated and sent to the paper tape reader controller where it is used to condition the controller for data transfers only.

When the controller has accumulated another word it sends it to the unbuffered channel through the usual interface. The unbuffered channel receives the word and sets the IDA flip-flop 166. The MIC will now transfer the data word from the UCR 160 through the DIM and DIR to the memory location whose address is contained in the P-counter (CDP). Immediately, the MIC will generate an output descriptor which is sent to the unbuffered channel. The unbuffered channel will store the descriptor in the UCR 160, set the BUSY flip-flop 161, condition itself to operate in the output mode and transmit the descriptor to the controller. The controller will receive the descriptor and conditions itself for output mode, that is, prepares itself to receive data, and returns the received signal to the unbuffered channel. This channel will reset the BUSY flip-flop 161 and be ready for the next operation.

The MIC examines the BUSY flip-flop 161 and when reset will initiate a memory cycle to read the data word just stored in memory. The data word is read from memory, sent to the UCR 160 and in turn sent to the controller using the standard interface.

The controller will receive the data word and while still on the data bus will do a comparison of the word on the bus with the word contained in the register. After the comparison is complete, the controller will send a received signal to the unbuffered channel. This channel will reset the BUSY flip-flop 161 and is ready for the next operation. The next operation, however, depends on the results of the comparison.

If the comparison is correct, the bootstrap operation continues. The MIC examines the BUSY bit or state of flip-flop 161 and when reset it will generate an input descriptor to send to the unbuffered channel. This channel will store the descriptor in the UCR 160 and in turn send it to the proper tape reader controller. The controller will continue in the bootstrap mode by assembling another data word to be sent to the unbuffered channel. Once the word is assembled and sent to the unbuffered channel the operation continues as described previously. The bootstrap will terminate when the proper tape reader controller detects an end of message character at which time it resets its bootstrap control flip-flop.

If the comparison is wrong, the bootstrap operation is terminated by the controller when it resets its bootstrap control flip-flop.

It will be apparent from the foregoing description of the invention and its mode of operation that there is provided an improved input/output control organization for use in a modular computer system. It should be understood that modifications of the arrangements described herein may be required to fit particular operating requirements. Such modifications will be apparent to those skilled in the art. The invention is not considered limited to the embodiments chosen for purpose of disclosure and covers all changes and modifications which do not constitute departures from the true spirit and scope of this invention. Accordingly, all such variations as are in accord with the principles discussed previously are meant to fall within the scope of the appended claims.

What is claimed is:

1. An input/output control system for use in an electronic computer having at least a central data processor and a memory comprising a module interface control unit and at least one input/output channel, said module interface control unit including a data multiplex unit for receiving information from said memory and said input/output channel and for gating said information to said central data processor, a data transfer unit including a data transfer control section, timing and control means comprised of separate memory, interrupt, clock and central data processor control portions, said data transfer control section being operatively connected to the memory and interrupt control portions of said timing and control means and to said data multiplex unit, the signals from said data transfer control section being applied to said data multiplex unit for selectively determining the information to be gated therethrough, an address multiplex register comprised of an address multiplex section, an address register section and an address decoder section, said address multiplex section receiving information from said central data processor and said input/output channel, the memory control portion of said timing and control means being operatively connected to said address multiplex section for selectively determining the information to be gated therethrough, said address multiplex section being operatively connected to said address register section whereby said last register stores the address of the information being accessed in a module of said memory together with information designating a particular memory module, said address register section being operatively connected to said address decoder whereby the information stored in said address register section designating said particular memory module is applied to said address decoder section, the initiate signals from said address decoder section enabling said particular memory module whereby said memory module may receive or transmit data to the address stored in said address register section as specified by the memory control portion of said timing and control means, said data transfer unit being adapted to receive information from said central data processor and to direct said information to said memory and said input/output channel, the enabling of the input section of the particular unit which is to receive said information being effected by signals applied thereto by said data transfer control section of said data transfer unit.

2. An input/output control system as defined in claim 1 further characterized in that said data multiplex unit is adapted to receive binary information in the form of both data words from said memory and control function words from said input/output channel, each memory word having a predetermined number of bits and each of said control function words varying in word length and having less, but not more, than said predetermined number of bits, said data multiplex unit being capable of modifying said control function words so as to supply to said central data processor output information of uniform word length having said predetermined number of bits.

3. An input/output control system as defined in claim 1 further characterized in that the information stored in said address register section comprises two portions, a first portion comprising a first plurality of most significant bits of an address word and a second portion comprising a second plurality of least significant bits of said address word, said first plurality of bits being decoded in said address decoder section thereby providing said initiate signals which are utilized in combination with signals from said timing and control means to select a particular memory module from said memory, and said second plurality of bits being utilized to define the location of the specific word to be accessed within said particular selected memory module.

4. An input/output control system as defined in claim 1 wherein said data transfer unit also includes a data transfer multiplex section which comprises a plurality of gates under control of said data transfer control section and said timing and control means for selectively routing the data received from either said central data processor or a buffered input/output channel to said memory.

5. An input/output control system as defined in claim 1 further including an interrupt unit mechanism comprising an interrupt selection gates unit, an interrupt register and an interrupt mask register, said interrupt selection gates unit including an interrupt selection gates section and an interrupt address adder, said interrupt register being adapted to receive an interrupt control signal from either said input/output channel or an external device, said interrupt selection gates section having an input terminal connected to said interrupt register and output terminals connected respectively to said timing and control means and to said interrupt address adder section, the output of the latter section being applied to said address multiplex register, said interrupt selection gates unit being adapted to route the interrupt control signal stored in said interrupt register to said timing and control means whereby said last mentioned means transmits an interrupt command to said central data processor, said interrupt selection gates unit simultaneously generating and providing a word address to said address multiplex register for determining the address at which the program interrupt will be executed, means under program control in said central data processor for resetting said interrupt register and causing the information stored therein to be transferred to said central data processor by way of said data multiplex unit, said interrupt mask register being operatively connected to both said data transfer unit and said interrupt selection gates section and being adapted to store a word instruction from said central data processor, said word instruction in said interrupt mask register determining whether or not said interrupt control signal in said interrupt register will be processed for a program interrupt.

6. An input/output control system as defined in claim 5 further characterized in that said interrupt register comprises a plurality of storage stages each of which is capable of storing a particular interrupt signal, said interrupt register being responsive to the leading edge of said interrupt signals such that interrupt signals of varying pulse lengths are effectively converted to single clock time pulses for setting selected ones of said storage stages of said interrupt register.

7. An input/output control system as defined in claim 5 further including an interrupt base address register, means including said central data processor for applying to said interrupt base address register a plurality of most significant bits of the address at which a particular interrupt operation will occur, said interrupt base address register storing said most significant bits, means for reading out the contents of said interrupt base address register in order that said contents may be combined with fixed information associated with said particular interrupt as supplied by said interrupt selection gates section, the combination of said contents of said interrupt base address register and said fixed information from said interrupt selection gates section taking place in said interrupt address adder section and forming the actual address in memory at which the first word of a subroutine for servicing said particular interrupt is located.

8. An input/output control system as defined in claim 5 further characterized in that said interrupt mask register comprises a plurality of bistable storage stages, the settings of each of said stages, in response to signals from said data transfer unit being capable of selectively inhibiting one or more of the gates of said interrupt selection gates, thereby preventing the interrupt signals corresponding to the inhibited gates from being transferred to said timing and control unit.

9. In an input/output control system for use in a computer having at least a central data processor and a memory, an unbuffered input-output channel comprising a channel register, means for storing in said channel register a device descriptor identifying the terminal device desired to be selected, a timing and control unit for providing a release command in common to a plurality of terminal devices, means effective at the termination of said release command for sending said device descriptor in common to said plurality of terminal devices and means for receiving a device number from one of said devices in response to said device descriptor, a device number comparator operatively connected to said channel register and to said means for receiving said device number, said device number comparator performing a comparison of the device descriptor sent to the devices with the device number received from the devices, a correct comparison in said comparator being indicative of the establishment of contact between said unbuffered input output channel and said desired terminal device, said device number comparator being capable of generating a "wrong comparison" interrupt signal in response to an incorrect device number being received from said terminal devices.

10. An input/output channel as defined in claim 9 further characterized in that said timing and control unit includes a timer for establishing a predetermined time period, means for initiating said time period simultaneously with the sending of said device descriptor to said terminal devices, the failure of said devices to return a device number during said time period causing said timing and control unit to generate a "fail to connect" interrupt signal at the termination of said time period.

11. An input/output channel as described in claim 9 including a plurality of input transfer gates for routing said device descriptor received from the data output multiplex unit associated with said central data processor to said channel register and a plurality of output transfer gates for routing said device descriptor from said channel register to said terminal devices.

12. In an input/output control system for use in a computer system having at least a central data processor and a memory, an unbuffered input/output channel comprising an unbuffered channel register, input transfer gates coupled to said channel register and operatively connected to route information from the data output multiplex associated with said central data processor to said unbuffered channel register, output transfer gates coupled to said unbuffered channel register and operatively connected to route information from said unbuffered channel register to a plurality of terminal devices, a timing and control unit for synchronizing and controlling the operation of said unbuffered channel, a byte size register having an input terminal and an output terminal, a decoder and control unit having an input terminal and an output terminal, means coupling the input terminal of said byte size register to said data output multiplex whereby said byte size register stores the byte size of the information being routed by said input transfer gates, the output terminal of said byte size register being coupled to the input terminal of said decoder and control unit, the output terminal of said decoder and control unit being connected in common to said input transfer gates and said output transfer gates, said byte size register and said decoder and control unit serving to prime selected ones of said transfer gates in order that the information received from said data output multiplex will be placed in the proper byte size position in said unbuffered channel register and that the information transferred from said unbuffered channel register will be presented to said terminal devices in the required byte size.

13. An unbuffered input/output channel as defined in claim 12 further including a BUSY flip-flop, on I/O Active flip-flop, and an IDA flip-flop, each of the flip-flops being coupled to said timing and control unit and being set and reset thereby, the setting of said BUSY flip-flop being indicative of the presence of usable information in said channel register, the setting of said I/O Active flip-flop indicating that contact has been established between said unbuffered channel and a selected one of said terminal devices, and the setting of said IDA flip-flop indicating that an input data word is available for distribution by said unbuffered channel.

14. An unbuffered input/output channel as defined in claim 12 further including bootstrap control logic units for loading programs into said memory from a paper tape reader and comprising a paper tape reader controller, means for sending an address word from said controller to said unbuffered channel register for storage therein, circuit means for sending said address word to said central data processor for storage therein, circuit means for transmitting a data word from said controller to said unbuffered channel register, means for transferring the data word from said unbuffered channel register to the memory location specified by said address word, means for reading out the data word stored in said memory location and transmitting said data word to both said unbuffered channel register and to said controller, said controller performing a comparison of said data word being received thereby with the word stored in said channel register, whereby continued bootstrap operation takes place only in response to a correct comparison by said controller.

References Cited

UNITED STATES PATENTS

| | | | |
|---|---|---|---|
| 3,308,443 | 3/1967 | Couleur et al. | 340—172.5 |
| 3,305,839 | 2/1967 | Looschen et al. | 340—172.5 |
| 3,308,439 | 3/1967 | Tink et al. | 340—172.5 |
| 3,303,475 | 2/1967 | Hellerman et al. | 340—172.5 |
| 3,297,996 | 1/1967 | Grady | 340—172.5 |
| 3,293,612 | 12/1966 | Ling | 340—172.5 |
| 3,286,240 | 11/1966 | Thompson et al. | 340—172.5 |
| 3,281,793 | 10/1966 | Oeters et al. | 340—172.5 |
| 3,258,749 | 6/1966 | Jenkins | 340—172.5 |
| 3,245,043 | 4/1966 | Gaffney et al. | 340—172.5 |
| 3,235,879 | 2/1966 | Herold et al. | 340—172.5 |
| 3,230,509 | 1/1966 | Spencer | 340—167 |
| 3,222,647 | 12/1965 | Strachey | 340—172.5 |
| 3,200,380 | 8/1965 | MacDonald et al. | 340—172.5 |
| 3,181,124 | 4/1965 | Hammel | 340—172.5 |
| 3,133,268 | 5/1964 | Avakian et al. | 340—152 |
| 2,910,238 | 10/1959 | Miles et al. | 235—167 |

PAUL J. HENON, *Primary Examiner.*

G. D. SHAW, *Assistant Examiner.*

UNITED STATES PATENT OFFICE
CERTIFICATE OF CORRECTION

Patent No. 3,419,852 December 31, 1968

Hans B. Marx et al.

It is certified that error appears in the above identified patent and that said Letters Patent are hereby corrected as shown below:

Column 1, line 20, "synchronizing" should read -- synchronization --. Column 5, line 65, "respective" should read -- responsive --. Column 6, line 68, after "address", first occurrence, insert -- adder section 153b of the gate unit 153 --; same line 68, "142" should read -- 152 --. Column 8, line 74, "so" should read -- to --. Column 9, line 74, cancel "from the program or by a conditional release". Column 11, line 16, "represented" should read -- presented --.

Signed and sealed this 10th day of March 1970.

(SEAL)
Attest:

Edward M. Fletcher, Jr. WILLIAM E. SCHUYLER, JR.
Attesting Officer Commissioner of Patents